United States Patent
Cheng

(10) Patent No.: US 9,817,267 B2
(45) Date of Patent: Nov. 14, 2017

(54) LIQUID CRYSTAL DISPLAYS AND THE DISPLAY METHODS THEREOF

(71) Applicant: Wuhan China Star Optoelectronics Technology Co., Ltd., Wuhan, Hubei (CN)

(72) Inventor: Yan Cheng, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 182 days.

(21) Appl. No.: 14/901,031

(22) PCT Filed: Dec. 18, 2015

(86) PCT No.: PCT/CN2015/097897
§ 371 (c)(1),
(2) Date: Dec. 27, 2015

(87) PCT Pub. No.: WO2017/088220
PCT Pub. Date: Jun. 1, 2017

(65) Prior Publication Data
US 2017/0199423 A1 Jul. 13, 2017

(30) Foreign Application Priority Data
Nov. 27, 2015 (CN) .......................... 2015 1 0852657

(51) Int. Cl.
*G02F 1/1335* (2006.01)
*G02F 1/1368* (2006.01)
*F21V 8/00* (2006.01)

(52) U.S. Cl.
CPC ....... *G02F 1/133553* (2013.01); *G02B 6/005* (2013.01); *G02B 6/0023* (2013.01); *G02B 6/0026* (2013.01); *G02B 6/0056* (2013.01); *G02F 1/1368* (2013.01); *G02F 1/133514* (2013.01); *G02F 1/133621* (2013.01); *G02F 2001/133565* (2013.01); *G02F 2001/133614* (2013.01); *G02F 2001/133616* (2013.01); *G02F 2202/36* (2013.01)

(58) Field of Classification Search
CPC ......... G02F 1/133553; G02F 1/133514; G02F 1/1368; G02F 1/133621; G02F 2202/36; G02F 2001/133614; G02F 2001/133616; G02F 2001/133565; G02B 6/0026; G02B 6/0023; G02B 6/0056; G02B 6/005
USPC .......................................................... 349/65
See application file for complete search history.

(56) References Cited

U.S. PATENT DOCUMENTS

2013/0271961 A1* 10/2013 Nakamura ................ F21V 9/00
362/97.2

* cited by examiner

*Primary Examiner* — Charles Chang
(74) *Attorney, Agent, or Firm* — Andrew C. Cheng

(57) ABSTRACT

A LCD and the display method thereof are disclosed. The LCD includes a light guiding plate, a light source, a QD media layer, a first polarizer, and an advanced polarization conversion film (APCF). The QD media layer is arranged between the light source and the first polarizer, the first polarizer and the APCF are arranged between the QD media layer and the light guiding plate. The light beams emitted from the light source pass through the QD media layer and activate the QD media layer to emit lights In this way, the brightness of the reflective LCD may be enhanced.

14 Claims, 2 Drawing Sheets

LIQUID CRYSTAL DISPLAYS AND THE DISPLAY METHODS THEREOF

BACKGROUND OF THE INVENTION

1. Field of the Invention

The present disclosure relates to liquid crystal display technology, and more particularly to a liquid crystal display (LCD) and the display method thereof.

2. Discussion of the Related Art

Reflective liquid crystal display technology relates to conduct the display via the reflection of light beams. FIG. 1 is a schematic view of the conventional total reflection LCD, which includes a polarizer 9 having a wave-phase-difference film, an array substrate 7 and a color film substrate 2 opposite to each other, and liquid crystals 5 between the array substrate 7 and the color film substrate 2. Generally, a reflective layer 6, TFTs, pixel electrodes, gate lines, and data lines are arranged on the array substrate, and the color film and the black matrix are arranged on the color film substrate. However, the display brightness of such LCD is low, and thus the LCD cannot display in a dark environment.

Thus, it is needed to provide a LCD and the display method thereof to overcome the above problems.

SUMMARY

The object of the invention is to provide a LCD and the display method thereof for enhancing the brightness of the reflective LCD.

In one aspect, a liquid crystal display (LCD) includes: a light guiding plate, a light source arranged at a light incident side of the light guiding plate, a quantum dot (QD) media layer, a first polarizer, and an advanced polarization conversion film (APCF) arranged on a surface of the first polarizer facing away the light guiding plate, the QD media layer is arranged between the light source and the first polarizer, the first polarizer and the APCF are arranged between the QD media layer and the light guiding plate; the light beams emitted from the light source pass through the QD media layer and activate the QD media layer to emit lights, a portion of the light beams from the QD media layer pass through the APCF and the first polarizer to generate the polarized beams entering the light guiding plate, the other portion of the light beams are reflected by the APCF to arrive the QD media layer, and activate the QD media layer to emit lights; a second polarizer arranged on an non-light-emitting-surface of the light guiding plate, a first substrate arranged on a light emitting surface of the light guiding plate, a second substrate opposite to the first substrate, a liquid crystal layer between the first substrate and the second substrate, and a reflective sheet arranged on a surface of the second substrate facing toward the liquid crystal layer, the non-light-emitting-surface is parallel to the light emitting surface, the light beams from the light guiding plate emit out from the light emitting surface, pass through the liquid crystal layer, and are reflected back toward the light guiding plate by the reflective sheet, most of the reflected light beams pass through the second polarizer and enter human eyes, a small portion of the reflected light beams are absorbed by the second polarizer, and the light beams emitted from the light source are blue light, and the blue light activate the QD media layer to emit white light.

Wherein the QD media layer includes media and QD dots arranged on the media.

Wherein the LCD further includes a wave-phase-difference film arranged on a surface of the second polarizer facing away the light guiding plate.

Wherein the first substrate is a color film substrate, and the second substrate is a thin film transistor (TFT) array substrate.

In another aspect, a LCD includes: a light guiding plate, a light source arranged at a light incident side of the light guiding plate, a quantum dot (QD) media layer, a first polarizer, and an advanced polarization conversion film (APCF) arranged on a surface of the first polarizer facing away the light guiding plate, the QD media layer is arranged between the light source and the first polarizer, the first polarizer and the APCF are arranged between the QD media layer and the light guiding plate; and the light beams emitted from the light source pass through the QD media layer and activate the QD media layer to emit lights, a portion of the light beams from the QD media layer pass through the APCF and the first polarizer to generate the polarized beams entering the light guiding plate, the other portion of the light beams are reflected by the APCF to arrive the QD media layer, and activate the QD media layer to emit lights.

Wherein the LCD further includes a second polarizer arranged on an non-light-emitting-surface of the light guiding plate, a first substrate arranged on a light emitting surface of the light guiding plate, a second substrate opposite to the first substrate, a liquid crystal layer between the first substrate and the second substrate, and a reflective sheet arranged on a surface of the second substrate facing toward the liquid crystal layer, the non-light-emitting-surface is parallel to the light emitting surface, the light beams from the light guiding plate emit out from the light emitting surface, pass through the liquid crystal layer, and are reflected back toward the light guiding plate by the reflective sheet, most of the reflected light beams pass through the second polarizer and enter human eyes, a small portion of the reflected light beams are absorbed by the second polarizer.

Wherein the QD media layer includes media and QD dots arranged on the media.

Wherein the light beams emitted from the light source are blue light, and the blue light activate the QD media layer to emit white light.

Wherein the LCD further includes a wave-phase-difference film arranged on a surface of the second polarizer facing away the light guiding plate.

Wherein the first substrate is a color film substrate, and the second substrate is a thin film transistor (TFT) array substrate.

In another aspect, a display method of LCDs includes: radiating a QD media layer by light beams emitted from a light source to activate the QD media layer so as to emit lights; controlling a first polarizer and an advanced polarization conversion film (APCF) between a light guiding plate and the QD media layer such that a portion of the light beams emitted from the QD media layer pass through the APCF and the first polarizer to generate the polarized beams entering the light guiding plate, and the other portion of the light beams are reflected by the APCF to arrive the QD media layer so as to activate the QD media layer to emit lights.

Wherein the LCD further includes a first substrate arranged on a light emitting surface of the light guiding plate, a second substrate opposite to the first substrate, a liquid crystal layer between the first substrate and the second substrate, and a reflective sheet arranged on a surface of the second substrate facing toward the liquid crystal layer, the method further includes: the light beams emitted from the light emitting surface of the light guiding plate and passing through the liquid crystal layer are reflected back to the light guiding plate by the reflective sheet; controlling the second polarizer arranged on the non-light-emitting-surface of the light guiding plate such that most of the light beams reflected by the reflective sheet pass through the second polarizer and enter human eyes, a small portion of the reflected light beams are absorbed by the second polarizer; and wherein the light emitting surface is parallel to the non-light-emitting-surface.

Wherein the method further includes: when the LCD is in a dark state, the second polarizer on the non-light-emitting-surface of the light guiding plate absorbs the leaked light beams from the light guiding plate.

Wherein the light beams emitted from the light source are blue light, and the blue light activate the QD media layer to emit white light.

In view of the above, the first polarizer and the APCF are arranged between the QD media layer and the light guiding plate. The light beams from the light source enter the QD media layer, activate the QD media layer, and emit lights. A portion of the light beams from the QD media layer pass through the APCF and the first polarizer to generate the polarized beams entering the light guiding plate. The other portion of the light beams are reflected by the APCF to arrive the QD media layer, and activate the QD media layer to emit lights. The light utilization is enhanced by such configuration, and the display brightness of the LCD may be enhanced.

DETAILED DESCRIPTION OF THE EMBODIMENTS

Embodiments of the invention will now be described more fully hereinafter with reference to the accompanying drawings, in which embodiments of the invention are shown.

Figure 1:
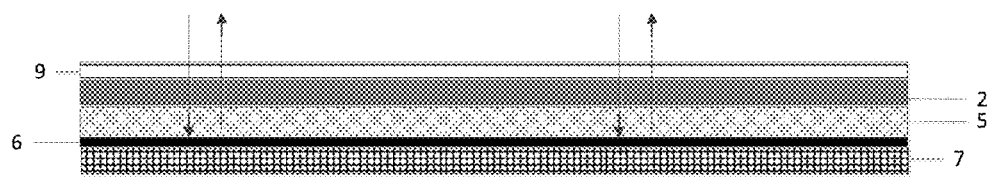
FIG. 1 is a schematic view of the conventional total reflection LCD
Figure 2:
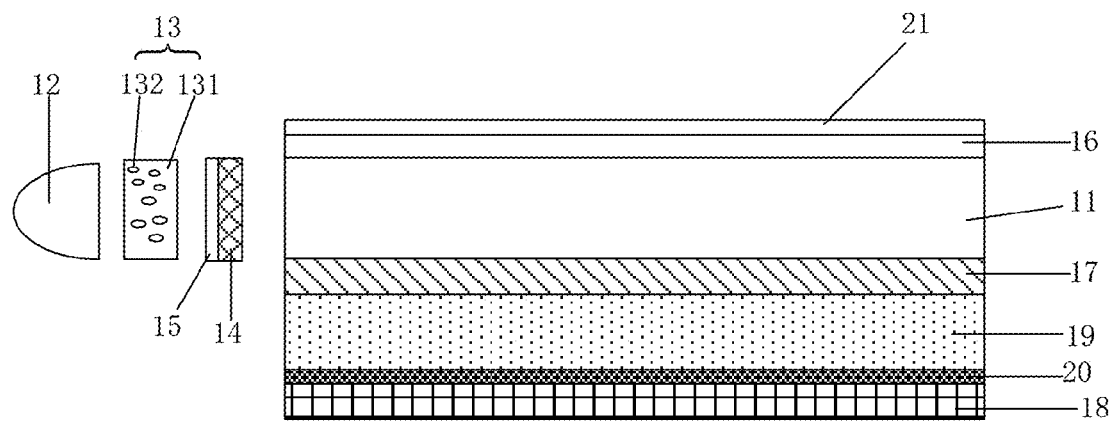
FIG. 2 is a schematic view of the LCD in accordance with one embodiment.

FIG. 2 is a schematic view of the LCD in accordance with one embodiment.

In the embodiment, the LCD includes a light guiding plate 11, a light source 12 arranged at a light incident side of the light guiding plate 11, a quantum dot (QD) media layer 13, a first polarizer 14, and an advanced polarization conversion film (APCF) arranged on a surface of the first polarizer 14 facing away the light guiding plate 11. The QD media layer 13 is arranged between the light source 12 and the first polarizer 14. The first polarizer 14 and the APCF 15 are arranged between the QD media layer 13 and the light guiding plate 11.

The light beams emitted from the light source 12 pass through the QD media layer 13 and activate the QD media layer 13 to emit lights. A portion of the light beams from the QD media layer 13 pass through the APCF 15 and the first polarizer 14 to generate the polarized beams entering the light guiding plate 11. The other portion of the light beams are reflected by the APCF 15 to arrive the QD media layer 13, and activate the QD media layer 13 to emit lights.

Preferably, the LCD further includes a second polarizer 16 arranged on an non-light-emitting-surface of the light guiding plate 11, a first substrate 17 arranged on a light emitting surface of the light guiding plate 11, a second substrate 18 opposite to the first substrate 17, a liquid crystal layer 19 between the first substrate 17 and the second substrate 18, and a reflective sheet 20 arranged on a surface of the second substrate 18 facing toward the liquid crystal layer 19. The non-light-emitting-surface is parallel to the light emitting surface. The light beams emitted from the light guiding plate 11 emit out from the light emitting surface, pass through the liquid crystal layer 19, and are reflected back toward the light guiding plate 11 by the reflective sheet 20. Most of the reflected light beams pass through the second polarizer 16 and enter human eyes. A small portion of the reflected light beams are absorbed by the second polarizer 16. Preferably, when the LCD is in a dark state, the second polarizer 16 on the non-light-emitting-surface of the light guiding plate 11 absorbs the leaked light beams from the light guiding plate 11, which increases the brightness of the LCD.

Preferably, the QD media layer 13 includes media 131 and a plurality of QD dots 132 arranged on the media 131.

Preferably, the light beams emitted from the light source 12 are blue light, and the blue light activate the QD media layer 13 to emit white light. The QD dots 132 includes a plurality of QDs 132 of different particle sizes. The QDs 132 of different particle sizes are activated by the blue light to emit monochromatic light of different colors. The monochromatic light may be red, green, and blue. The blue light emitted by the light source 12 activate the QDs within the QD media layer 13 to emit the red, green, and blue lights, and the lights of different colors are mixed to be white light.

Preferably, the LCD further includes a wave-phase-difference film 21 on a surface of the second polarizer 16 facing away the light guiding plate 11.

Preferably, the first substrate 17 may be a color film substrate 17, and the second substrate 18 may be a thin film transistor (TFT) array substrate 18.

It can be understood that the LCD may include other fixing components, such as a back frame (not shown), a middle frame installed within the back frame (not shown), and a circuit board installed on the middle frame (not shown). The light source 12, the QD media layer 13, the first polarizer 14, and the APCF 15 may be installed on the circuit board. The light guiding plate 11, the first substrate 17, the second substrate 18, the liquid crystal layer 19, the reflective sheet 20, and the second polarizer 16 may be installed within the back frame. It can be understood that the above components may be assembled in other manners.

Figure 3:
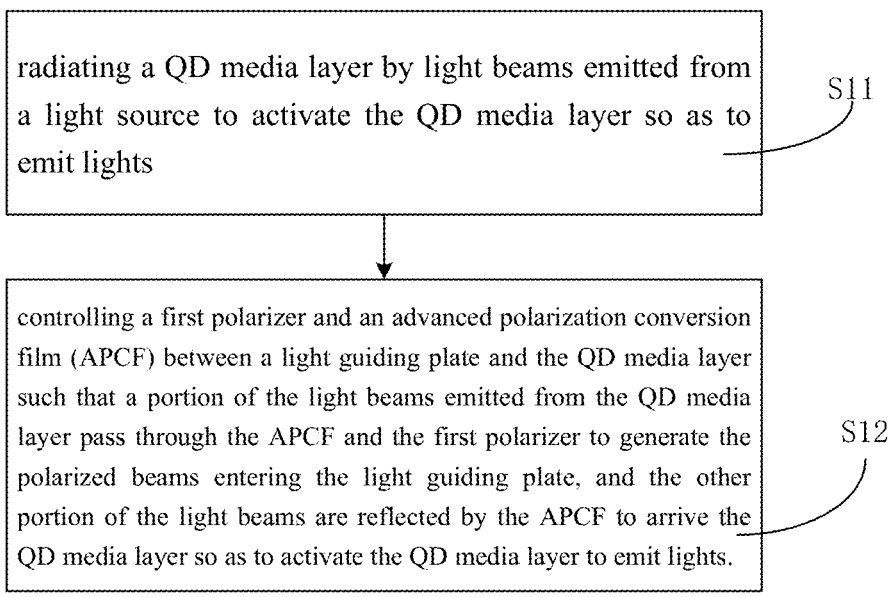
FIG. 3 is a flowchart of the display method of the LCD in accordance with one embodiment.

FIG. 3 is a flowchart of the display method of the LCD in accordance with one embodiment. The method including the following steps.

In block S11, the light beams emitted from the light source enter the QD media layer, activate the QD media layer, and emit lights.

In block S11, preferably, the QD media layer 13 includes media 131 and a plurality of QD dots 132 arranged on the media 131. The light beams emitted from the light source 12 are blue light, and the blue light activate the QD media layer 13 to emit white light. The QD dots 132 includes a plurality of QDs 132 of different particle sizes. The QDs 132 of different particle sizes are activated by the blue light to emit monochromatic light of different colors. The monochromatic light may be red, green, and blue. The blue light emitted by the light source 12 activate the QDs within the QD media layer 13 to emit the red, green, and blue lights, and the lights of different colors are mixed to be white light.

In block S12, the first polarizer and the APCF between the light guiding plate and the QD media layer are controlled such that a portion of the light beams emitted from the QD media layer pass through the APCF and the first polarizer to generate the polarized beams entering the light guiding plate. The other portion of the light beams are reflected by the APCF to arrive the QD media layer, and activate the QD media layer 13 to emit lights.

In block S12, preferably, the light beams emitted from the light source 12 pass through the QD media layer 13 and activate the QD media layer 13 to emit lights. A portion of the light beams from the QD media layer 13 pass through the APCF 15 and the first polarizer 14 to generate the polarized beams entering the light guiding plate 11. The other portion of the light beams are reflected by the APCF 15 to arrive the QD media layer 13, and activate the QD media layer 13 to emit lights.

Preferably, the LCD further includes the first substrate 17 on the light emitting surface of the light guiding plate 11, the second substrate 18 opposite to the first substrate 17, the liquid crystal layer 19 between the first substrate 17 and the second substrate 18, and the reflective sheet 20 arranged on a surface of the second substrate 18 facing toward the liquid crystal layer 19. The display method further includes: the light beams emitted from the light emitting surface of the light guiding plate 11 and passing through the liquid crystal layer 19 are reflected back to the light guiding plate 11 by the reflective sheet 20; the second polarizer 16 arranged on the non-light-emitting-surface of the light guiding plate 11 is controlled such that the most of the light beams reflected by the reflective sheet 20 pass through the second polarizer 16 and enter human eyes. A small portion of the reflected light beams are absorbed by the second polarizer 16, and wherein the light emitting surface is parallel to the non-light-emitting-surface.

Preferably, in the embodiment, the display method further includes: controlling the second polarizer 16 arranged on the non-light-emitting-surface of the light guiding plate 11 to absorb the leaked light of the light guiding plate 11 to increase the contrastness of the LCD.

In view of the above, the first polarizer and the APCF are arranged between the QD media layer and the light guiding plate. The light beams from the light source enter the QD media layer, activate the QD media layer, and emit lights. A portion of the light beams from the QD media layer pass through the APCF and the first polarizer to generate the polarized beams entering the light guiding plate. The other portion of the light beams are reflected by the APCF to arrive the QD media layer, and activate the QD media layer to emit lights. The light utilization is enhanced by such configuration, and the display brightness of the LCD may be enhanced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal display (LCD), comprising:
   a light guiding plate, a light source arranged at a light incident side of the light guiding plate, a quantum dot (QD) media layer, a first polarizer, and an advanced polarization conversion film (APCF) arranged on a surface of the first polarizer facing away the light guiding plate, the QD media layer is arranged between the light source and the first polarizer, the first polarizer and the APCF are arranged between the QD media layer and the light guiding plate;
   the light beams emitted from the light source pass through the QD media layer and activate the QD media layer to emit lights, a portion of the light beams from the QD media layer pass through the APCF and the first polarizer to generate the polarized beams entering the light guiding plate, the other portion of the light beams are reflected by the APCF to arrive the QD media layer, and activate the QD media layer to emit lights; and
   a second polarizer arranged on an non-light-emitting-surface of the light guiding plate, a first substrate arranged on a light emitting surface of the light guiding plate, a second substrate opposite to the first substrate, a liquid crystal layer between the first substrate and the second substrate, and a reflective sheet arranged on a surface of the second substrate facing toward the liquid crystal layer, the non-light-emitting-surface is parallel to the light emitting surface, the light beams from the light guiding plate emit out from the light emitting surface, pass through the liquid crystal layer, and are reflected back toward the light guiding plate by the reflective sheet, most of the reflected light beams pass through the second polarizer and enter human eyes, a small portion of the reflected light beams are absorbed by the second polarizer, and the light beams emitted from the light source are blue light, and the blue light activate the QD media layer to emit white light.

2. The LCD as claimed in claim 1, wherein the QD media layer comprises media and QD dots arranged on the media.

3. The LCD as claimed in claim 1, wherein the LCD further comprises a wave-phase-difference film arranged on a surface of the second polarizer facing away the light guiding plate.

4. The LCD as claimed in claim 1, wherein the first substrate is a color film substrate, and the second substrate is a thin film transistor (TFT) array substrate.

5. A LCD, comprising:
   a light guiding plate, a light source arranged at a light incident side of the light guiding plate, a quantum dot (QD) media layer, a first polarizer, and an advanced polarization conversion film (APCF) arranged on a surface of the first polarizer facing away the light guiding plate, the QD media layer is arranged between the light source and the first polarizer, the first polarizer and the APCF are arranged between the QD media layer and the light guiding plate; and
   the light beams emitted from the light source pass through the QD media layer and activate the QD media layer to emit lights, a portion of the light beams from the QD media layer pass through the APCF and the first polarizer to generate the polarized beams entering the light guiding plate, the other portion of the light beams are reflected by the APCF to arrive the QD media layer, and activate the QD media layer to emit lights.

6. The LCD as claimed in claim 5, wherein the LCD further comprises a second polarizer arranged on an non-light-emitting-surface of the light guiding plate, a first substrate arranged on a light emitting surface of the light guiding plate, a second substrate opposite to the first substrate, a liquid crystal layer between the first substrate and the second substrate, and a reflective sheet arranged on a surface of the second substrate facing toward the liquid crystal layer, the non-light-emitting-surface is parallel to the light emitting surface, the light beams from the light guiding plate emit out from the light emitting surface, pass through the liquid crystal layer, and are reflected back toward the light guiding plate by the reflective sheet, most of the reflected light beams pass through the second polarizer and enter human eyes, a small portion of the reflected light beams are absorbed by the second polarizer.

7. The LCD as claimed in claim 6, wherein the LCD further comprises a wave-phase-difference film arranged on a surface of the second polarizer facing away the light guiding plate.

8. The LCD as claimed in claim 6, wherein the first substrate is a color film substrate, and the second substrate is a thin film transistor (TFT) array substrate.

9. The LCD as claimed in claim 5, wherein the QD media layer comprises media and QD dots arranged on the media.

10. The LCD as claimed in claim 5, wherein the light beams emitted from the light source are blue light, and the blue light activate the QD media layer to emit white light.

11. A display method of LCDs, comprising:
   radiating a QD media layer by light beams emitted from a light source to activate the QD media layer so as to emit lights;
   controlling a first polarizer and an advanced polarization conversion film (APCF) between a light guiding plate and the QD media layer such that a portion of the light beams emitted from the QD media layer pass through the APCF and the first polarizer to generate the polarized beams entering the light guiding plate, and the other portion of the light beams are reflected by the APCF to arrive the QD media layer so as to activate the QD media layer to emit lights.

12. The display method as claimed in claim 11, wherein the LCD further comprises a first substrate arranged on a light emitting surface of the light guiding plate, a second substrate opposite to the first substrate, a liquid crystal layer between the first substrate and the second substrate, and a reflective sheet arranged on a surface of the second substrate facing toward the liquid crystal layer, the method further comprises:
   the light beams emitted from the light emitting surface of the light guiding plate and passing through the liquid crystal layer are reflected back to the light guiding plate by the reflective sheet;
   controlling the second polarizer arranged on the non-light-emitting-surface of the light guiding plate such that most of the light beams reflected by the reflective sheet pass through the second polarizer and enter human eyes, a small portion of the reflected light beams are absorbed by the second polarizer; and
   wherein the light emitting surface is parallel to the non-light-emitting-surface.

13. The display method as claimed in claim 12, wherein the method further comprises:
   when the LCD is in a dark state, the second polarizer on the non-light-emitting-surface of the light guiding plate absorbs the leaked light beams from the light guiding plate.

14. The display method as claimed in claim 11, wherein the light beams emitted from the light source are blue light, and the blue light activate the QD media layer to emit white light.

* * * * *